(12) United States Patent
Tiedemann, Jr.

(10) Patent No.: US 6,882,631 B1
(45) Date of Patent: Apr. 19, 2005

(54) METHOD AND APPARATUS FOR OVERLAYING TWO CDMA SYSTEMS ON THE SAME FREQUENCY BANDWIDTH

(75) Inventor: Edward G. Tiedemann, Jr., San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/395,300

(22) Filed: Sep. 13, 1999

(51) Int. Cl.[7] .......................... H04B 7/216; H04Q 7/20
(52) U.S. Cl. .................. 370/335; 370/329; 370/342; 370/350; 455/442
(58) Field of Search ........................ 370/329, 342, 370/350, 441–443, 500, 503, 516, 330–335, 348; 455/436, 437, 442, 450, 524–525, 453, 447, 515, 506; 375/358, 130

(56) References Cited

U.S. PATENT DOCUMENTS

| | | | |
|---|---|---|---|
| 5,224,120 A | 6/1993 | Schilling | |
| 5,446,727 A * | 8/1995 | Bruckert et al. | 370/342 |
| 5,471,463 A | 11/1995 | Hulbert | 370/18 |
| 5,577,031 A * | 11/1996 | Smith | 370/329 |
| 5,608,765 A | 3/1997 | Tanoue | 375/365 |
| 5,828,659 A | 10/1998 | Teder et al. | 370/328 |
| 5,907,577 A * | 5/1999 | Hoole | 375/130 |
| 5,912,886 A * | 6/1999 | Takahashi et al. | 370/350 |
| 5,960,347 A * | 9/1999 | Ozluturk | 455/442 |
| 5,983,113 A * | 11/1999 | Asanuma | 455/506 |
| 6,208,871 B1 * | 3/2001 | Hall et al. | 455/517 |
| 6,285,669 B1 * | 9/2001 | Gutierrez | 370/335 |
| 6,377,606 B1 * | 4/2002 | Toskala et al. | 375/130 |

* cited by examiner

Primary Examiner—Frank Duong
Assistant Examiner—Melanie Jagannathan
(74) Attorney, Agent, or Firm—Philip Wadsworth; Thien T. Nguyen; Sean English

(57) ABSTRACT

In order to align the timing of an overlay base station to the timing of an existing base station, a sync unit is introduced into the system. The sync unit has a first receiver configured to receive a first signal, the first signal having a first CDMA channelization. The first receiver is configured to produce an indication of a timing of the first signal. The sync unit also has a second receiver configured to receive a second signal, the second signal having a second CDMA channelization. The second receiver is configured to produce an indication of a timing of the second signal. The sync unit also has a time error detection unit configured to compare the timing of the first signal and the timing of the second signal to determine a relative timing offset thereof.

18 Claims, 8 Drawing Sheets

METHOD AND APPARATUS FOR OVERLAYING TWO CDMA SYSTEMS ON THE SAME FREQUENCY BANDWIDTH

BACKGROUND OF THE INVENTION

1. Field of the Invention

The invention relates to communication systems. In particular, the invention relates to overlaying code division multiple access communication systems.

2. Description of the Related Art

The wireless medium is becoming one of the predominate means by which voice information and digital data are transferred in modern society. In wireless communication systems, it is common that a single base station transmits signals to a plurality of remote units. In order to combat the harsh multipath wireless transmission channel while providing signaling to a plurality of remote units, modulation and coding schemes which provide efficient data transfer, as well as user channelization, have been developed. In general, these schemes operate most efficiently when each signal from a base station is transmitted with synchronized timing. For example, in a typical code division multiple access (CDMA) system, the signals are distinguished from one another through the use of different codes. In the case of transmissions from a base station to a remote unit, these codes are typically an orthogonal set of codes such as, for example, Walsh functions. If the transmissions corresponding to one orthogonal channel become misaligned with the transmissions corresponding to another channel, the orthogonal nature of the codes is degraded and the transmissions may significantly interfere with one another.

FIG. 1 is an exemplifying embodiment of a terrestrial wireless communication system 10. FIG. 1 shows three remote units 12A, 12B and 12C and two base stations 14. In reality, typical wireless communication systems may have many more remote units and base stations. In FIG. 1, the remote unit 12A is shown as a mobile telephone unit installed in a car. FIG. 1 also shows the portable computer remote unit 12B and the fixed location remote unit 12C such as might be found in a wireless local loop or meter reading system. In the most general embodiment, the remote units may be any type of communication unit. For example, the remote units can be hand-held portable units, portable data units such as a personal data assistant, or fixed location data units such as meter reading equipment. FIG. 1 shows a forward link signal 18 from the base stations 14 to the remote units 12 and a reverse link signal 20 from the remote units 12 to the base stations 14.

In the discussion that follows, to aid in illustration, the invention is described with reference to a commonly known, wireless link industry standard. In fact, the generic principles of the invention can be directly applied to many multiple access communication systems. The discussion that follows assumes operation in accordance with the system described in TIA/EIA/IS-95-A and its progeny, the contents of which are incorporated herein by reference, published by the Telephone Industry Association entitled "Mobile Station-Base Station Compatibility Standard for Dual-Mode Wideband Spread Spectrum Cellular System" commonly referred to as IS-95.

In a typical wireless communication system, such as that illustrated in FIG. 1, some base stations have multiple sectors. A multi-sectored base station comprises multiple independent transmit and receive antennas as well as independent processing circuitry. The principles discussed herein apply equally to each sector of a multi-sectored base station and to a single sectored independent base station. For the remainder of this description, therefore, the term "base station" can be assumed to refer to either a sector of a multi-sectored base station or a single sectored base station.

In systems using IS-95, remote units use a common frequency bandwidth for communication with all base stations in the system. Use of a common frequency bandwidth adds flexibility and provides many advantages to the system. For example, use of a common frequency bandwidth enables a remote unit to simultaneously receive communication signals from more than one base station, as well as transmit a single signal for reception by more than one base station. The remote unit discriminates between the simultaneously received signals from the various base stations through the use of the spread spectrum CDMA waveform properties.

In a wireless system, maximizing the capacity of the system in terms of the number of simultaneous calls that can be handled is extremely important. If a minimum acceptable signal quality is specified, an upper bound on the number of simultaneous users which can communicate through a base station can be calculated. With some simplifications, the amount of power that a remote unit must transmit is given by Equation 1:

$$P = \frac{RN_0 \left(\frac{E_b}{N_t}\right)_{req}}{1 - \frac{R}{W}(N-1)\left(\frac{E_b}{N_t}\right)_{req} - \alpha \frac{R}{W}\left(\frac{E_b}{N_t}\right)_{req}} \quad \text{Eq. 1}$$

wherein:

N is the number of remote units operating within a common coverage area;

R is the average data rate, which is assumed the same for all remote units;

W is the spreading rate;

$N_0$ is the thermal noise floor of the base station plus interference from non-power controlled sources;

$$\left(\frac{E_b}{N_t}\right)_{reg}$$

is the required energy per noise spectral density for a remote unit, which is assumed equal for each remote unit; and α is the interference coupling coefficient from all other coverage areas.

The upper bound on the number of simultaneous users is commonly referred to as the pole capacity of a system and is given when the denominator of Equation 1 is equal to zero. The ratio of the actual number of users to the pole capacity is defined as the loading of the system. As the number of actual users approaches the pole capacity, loading approaches unity. A loading close to unity implies potentially unstable behavior of the system. Unstable behavior can lead to degraded performance in terms of voice quality, high error rates, failed handoffs and dropped calls. In addition, as loading increases, the required output power of the remote unit increases. Because the output power of the remote unit is limited, the size of the coverage area of the base station shrinks such that users on the outer edge of the no-load coverage area are no longer be able to transmit sufficient power to communicate with the base station at an acceptable signal quality when the base station becomes heavily loaded. Equation is specifically for the reverse link. However, there is a comparable equation for the forward link with comparable effects. For the forward link, as the loading increases, the required output power of the base station increases.

For these reasons, it is advantageous to limit the number of users which access the system such that loading does not exceed a specified percentage of the pole capacity. One way to limit the loading of the system is to deny access to the system once the loading of the system has reached a predetermined level. For example, if the loading increases above 70% of the pole capacity, it is advantageous to deny requests for additional connection originations and to refrain from accepting hand-off of existing connections.

When two CDMA systems are operated within a common bandwidth, these same issues of loading as well as time and phase synchronization are still important. If the two systems are overlaid without paying attention to their underlying properties, resulting capacity can be quite low. This is particularly true for the forward link where the signals radiated by the base station are typically orthogonal. For example, the forward link wave forms described in the above-referenced IS-95 are orthogonal to one another. If the overlaid signal set is not orthogonal to the existing signal set, then the capacity reduction can be quite large. In order to maintain orthogonality, the two systems must be time synchronized with one another. In addition, the capacity of the two systems is also related in that the loading on the first system acts as interference to the second, thereby decreasing the capacity of the second system, and the loading on the second system acts as interference to the first, thereby decreasing the capacity of the first system.

Use of a pilot signal improves the capacity on the forward link. The pilot signal is used for acquisition and channel estimation such as, for example, timing, phase, power control, and received symbol weighting. The other signals transmitted by the base station have a known and constant phase alignment with respect to the pilot signal. To avoid transmitting multiple pilot signals, it is preferable to maintain the constant phase alignment with respect to the overlaid channels.

When deploying a second CDMA system in the presence of an existing system, the existing system is not typically configured with the capability of interfacing with a second type of system. Therefore, the existing system does not typically provide the outputs or accept the inputs which are required to achieve synchronization and co-ordinate loading between the two systems. In contrast, the new system can be designed with such an overlay configuration in mind. In order to reduce the cost of deploying a second overlay system, it is important to avoid modification of the existing system.

Therefore, there is a need in the art for a system and method for overlaying two CDMA systems on the same frequency bandwidth.

SUMMARY OF THE INVENTION

In order to overlay a second CDMA system over an existing system, the timing of the signals transmitted by each system needs to be aligned. In order to avoid modifying the existing system, a sync unit is used to receive signals from the first and second systems. By comparing the timing of the signals, an error signal indicative of a timing offset is generated. The timing error signal is coupled to the second CDMA system and is used to adjust the timing of the second system in order to reduce the timing difference between the two systems. In some cases, the phase of the two systems is aligned in a similar manner.

When a second CDMA system overlays an existing system, the capacity of each system is limited by the loading on the other system. In one embodiment, the sync unit also measures the power of a set of signals transmitted by both systems and determines therefrom a level of loading.

DETAILED DESCRIPTION OF THE INVENTION

When a third generation, broadband, code divisional multiple access (CDMA) system is deployed in a service area previously providing an earlier generation of a CDMA system, it is often advantageous to overlay the operating spectrum of the broadband system with the existing system. For example, a cdma2000 system using an 1× mode spreading rate of 1.2288 Mcps (a bandwidth of approximately 1.25 MHz) can be overlaid in an older generation IS-95 system which also uses a spreading rate of 1.2288 Mcps (a bandwidth of approximately 1.25 MHz). The cdma2000 system also has a 3× mode which uses a spreading rate of 3×1.2288 Mcps (a bandwidth of approximately 3.75 MHz). One of the cdma2000 3× modes has a multicarrier forward link which can overlay an older generation IS-95 system or a cdma2000 1× system.

Figure 1:
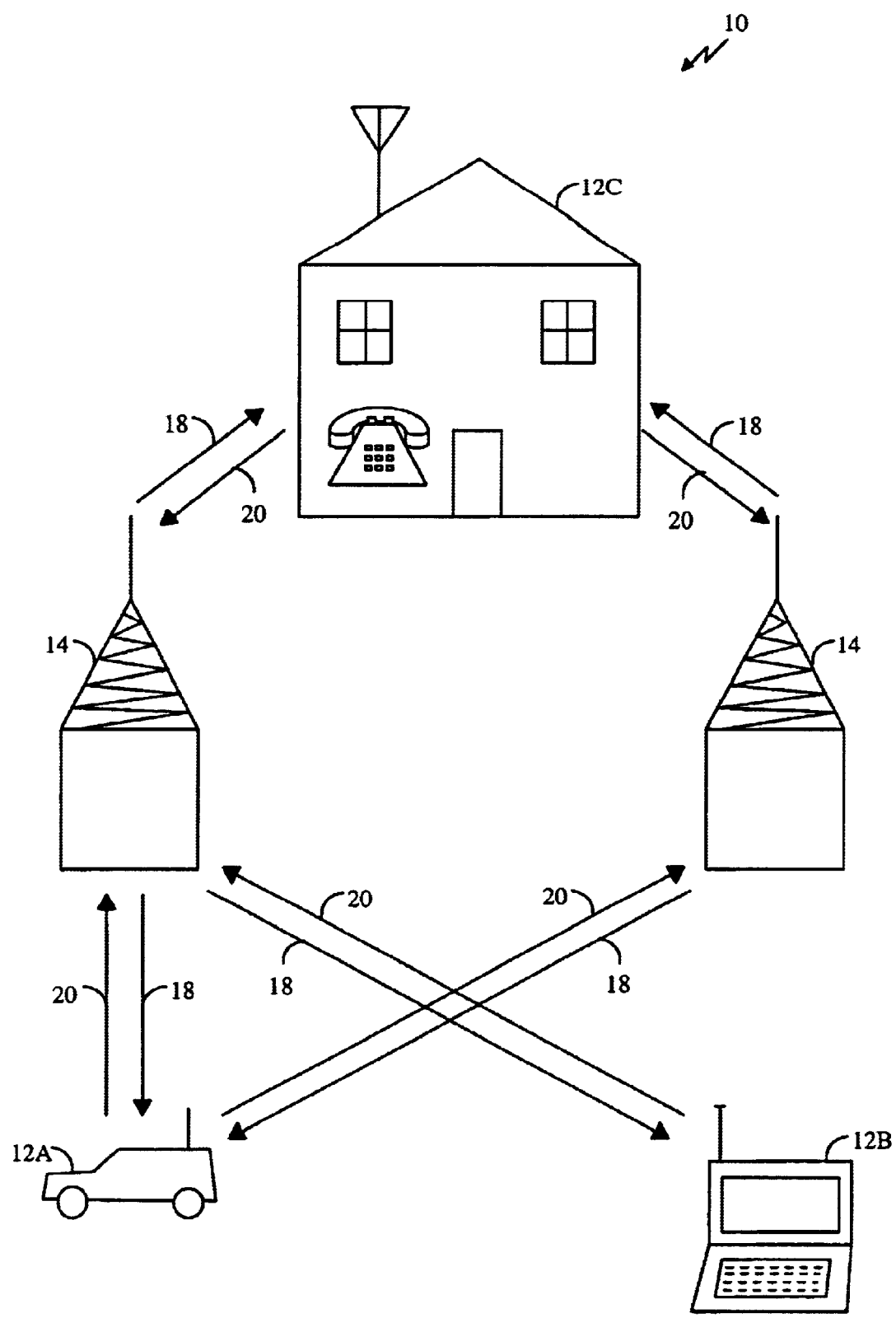
FIG. 1 is a block diagram of an exemplifying terrestrial wireless communication system.
Figure 2:
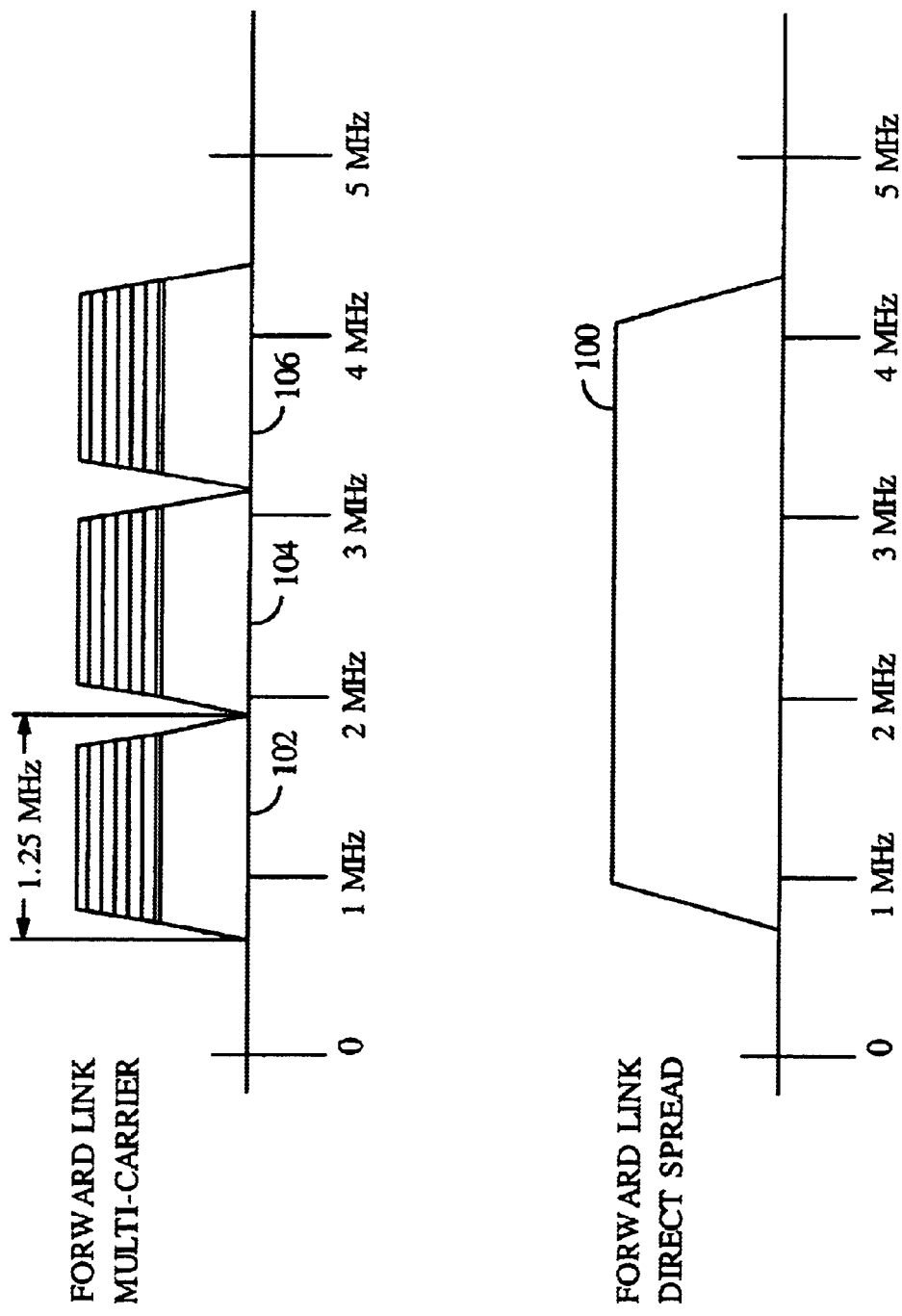
FIG. 2 is a frequency domain spectral plot showing the spectral characteristics of a cdma2000 system and an IS-95 system.

FIG. 2 is a spectral plot showing the spectral characteristics of the forward links for the cdma2000 system and the IS-95 system. Spectrum 100 represents one channel of the cdma2000 system operating in 3× mode and spectrums 102, 104 and 106 represent the spectrum for 3 IS-95 or cdma2000 1× mode channels. Spectrums 102, 104, and 106 also represent each carrier of the cdma2000 3× multi-carrier system. In order for such an overlay system to operate properly, both systems operate with a common timing so that the systems do not cause excessive interference to one another. If a common pilot channel is used, the two systems transmit their forward link code channels using a common phase which is aligned to a common forward link pilot channel phase. In addition, because these systems share the same bandwidth, the combined loading of both systems together must remain below an operating threshold in order to maintain system stability.

Figure 3:
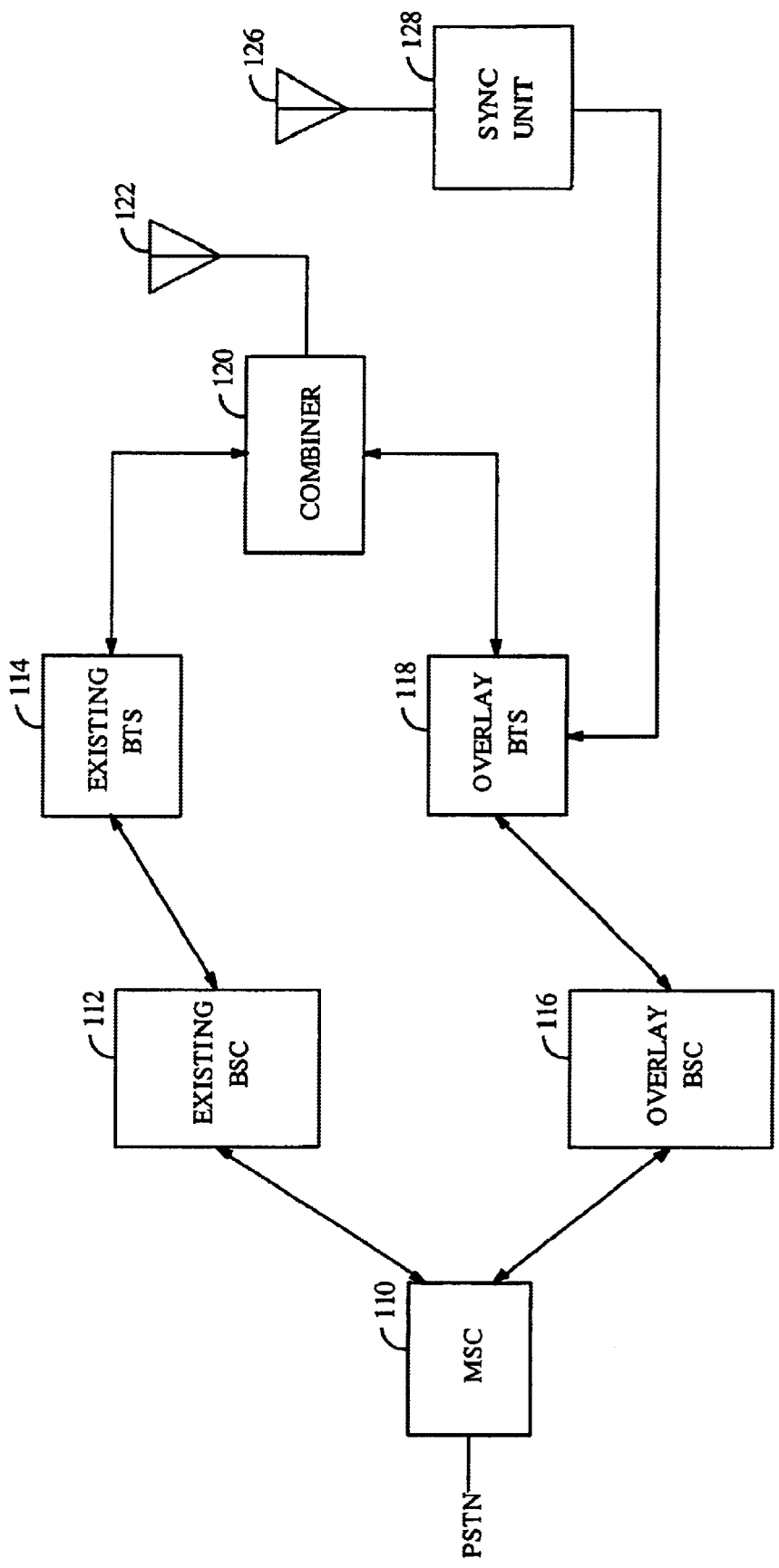
FIG. 3 is a block diagram showing a basic structure which can be used to implement the invention.

FIG. 3 is a block diagram showing a basic structure which can be used to implement the invention. A mobile switching center (MSC) 110 couples the cellular system to the public switch telephone network (PSTN). The MSC 110 is coupled to one or more base station controllers (BSC) 112 for the existing system. The BSC 112 provides control for a set of base stations such as the base station transceiver subsystem (BTS) 114. The BSC 112 provides control functions such as distribution of forward link signals to the base station transceiver subsystems as well as signal combination for reverse link signals received from the base station transceiver subsystems. The base station transceiver subsystems such as BTS 114 are typically scattered throughout the coverage area of the system in order to provide service to a corresponding base station coverage area. The BTS 114 provides the encoding and modulation as well as other features of the physical link in order to create the radio frequency (RF) signal for transmission over the wireless link for an existing system, such as an IS-95 system or cdma2000 system operating in 1× or 3× mode. The base station transceiver subsystem is typically coupled directly to an antenna, set of diversity antennas, or antenna array such as the antenna 122 shown in FIG. 3.

In addition to the existing system, FIG. 3 also shows an overlay system.

Although alternative implementations can be developed, in FIG. 3, the overlay system operates under the control of the MSC 110. The MSC 110 is coupled to an overlay base station controller 116 which provides control of a set of overlay base station receivers such as an overlay BTS 118 shown in FIG. 3. In the example FIG. 3, the overlaid BSC 116 and the existing BSC 112 are connected to the same MSC 110. However, each the existing and overlaid BSCs can be connected to different MSCs. The overlay BTS 118 creates and receives wireless link signaling according to a second CDMA protocol such as an IS-95 system or cdma2000 system operating in 1× or 3× mode.

In order to maintain a common phase and timing, the signals transmitted from each system can be transmitted through a common antenna. Therefore, a combiner 120 couples the existing BTS 114 and the overlay BTS 118 to the antenna 122. As shown in FIG. 3, the combiner 120 combines the output of the power amplifiers (not shown) of the exiting BTS 114 and the overlay BTS 118. However, generally, the combiner 120 can be implemented at one of many stages within the transmit chain. For example, in one embodiment, the combiner operates at an intermediate frequency, at analog baseband or at digital baseband.

Likewise, in the configuration shown in FIG. 3, the combiner 120 couples the antenna 122 to a low noise amplifier (not shown) within the existing BTS 114 and the overlay BTS 118. However, in alternative embodiments the combiner may be connected at other points within the receive chain. In yet another embodiment, the receive path of the existing base station 114 and the overlay base station 118 are independent of one another. For example, FIG. 3 shows the transmit and receive portions of the existing and overlay BTSs combined. However, the transmit and receive sections may be separate and may use different antennas.

The introduction of the overlay system is facilitated by a sync unit 128. In one embodiment, the sync unit 128 is coupled to an independent antenna 126 which is positioned within the coverage area of the antenna 122. In another embodiment, the sync unit obtains signal energy used to extract timing, signal phase, and loading, by using a coupler, such as a directional coupler, in the transmission lines between the combiner 120 and the antenna 122. In still yet another embodiment, the sync unit obtains timing and phase information through a pair of couplers with one coupler in the transmit chain or transmission line of the existing base station and the other coupler in the transmit chain or transmission line of the overlay base station In the context of this invention, the transmit chain is some portion of the BTS hardware itself and the transmission line is the feedline from the output of the power amplifier in the BTS to the antenna. In general, the transmitted signal can be obtained from any point where the appropriate information needed to determine timing, phase, loading can be obtained. When using information obtained from the transmit chain of a BTS, it is not necessary to use a single location for all pieces of information. For example, timing signals can be obtained in one part of the BTS and power levels can be obtained from another part of the BTS. However, if other than the antenna is used, it is possible to have errors between the location in which the information is obtained and the signal radiated by the antenna. As a result of these errors, the accuracy of setting timing, setting phase, or determining the load may be degraded. These issues are well know to those skilled in the art who understand the teaching of this invention. As shown in FIG. 3, the sync unit 128 is also coupled to the overlay BTS 118. However, in alternative embodiments, the sync unit 128 could be coupled to the existing base station 114 instead of the overlay base station 118. In general, however, the sync unit 128 facilitates time and phase synchronization of the two systems without requiring an additional input or output to the existing system. The sync unit 128 functions to synchronize the timing and phase of the overlay base station with that of the existing base station.

In order to maintain the orthogonality between the signals transmitted by the existing BTS 114 and the signals transmitted by the overlay BTS 118, the timing of the BTS's 114 and 118 must be aligned with one another as perceived by the remote units within the corresponding coverage area. In the cdma2000 system, only timing must be aligned in order to maintain orthogonality with an IS-95 system. However, other systems may require the signal phase to also be aligned. In addition, in order to use a common pilot channel, the phase must be aligned between the existing system and the overlay system.

For example, when overlaying a cdma2000 system with an IS-95 system, the code channels should be time-aligned within about one sixteenth ($\frac{1}{16}^{th}$) of a PN chip or approximately 50 nanoseconds. As the time-alignment error increases, the signals transmitted by the existing and the overlay base stations become less orthogonal. Signals which are not orthogonal interfere which each other and result in a lower system capacity.

In one embodiment, the overlay system uses the same pilot channel as the existing system. In this embodiment, the phase of each CDMA code channel transmitted by the overlay BTS 118 must be phase-aligned with the pilot signal transmitted by the existing BTS 114 because the remote uses the pilot signal transmitted from the existing BTS 114 to form a phase reference to demodulate the data signal from the overlay BTS 118.

Figure 4:
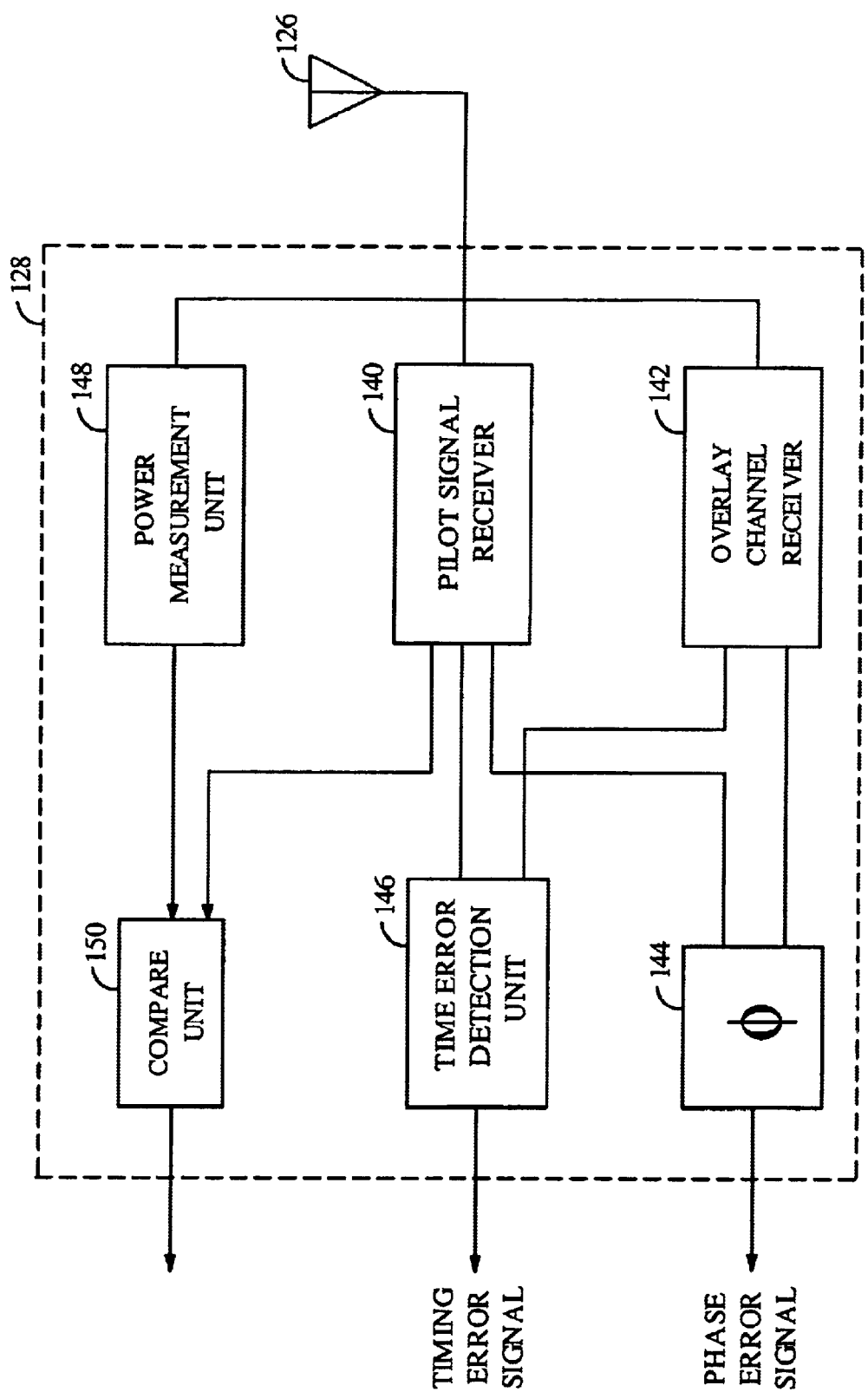
FIG. 4 is a block diagram of the sync unit of the invention.

FIG. 4 is a block diagram of the sync unit 128. In one embodiment, the sync unit 128 includes a pilot signal receiver 140. The construction of the pilot signal receiver can be very similar to the construction of a remote unit to implement well-known techniques of receiving a pilot signal in a CDMA system. In addition, the sync unit 128 includes an overlay channel receiver 142 which serves to receive a channel from the overlay base station. For example, in a cdma2000 system, the overlay channel receiver 142 (which can also be constructed according to well-known techniques) can be used to receive the Forward Common Control Channel (F-CCCH), the Forward Broadcast Control Channel (F-BCCH), or any other signal transmitted by the overlay base station. Preferably, the monitored signal is transmitted continuously. The pilot signal receiver 140 generates a timing and phase signal. The overlay channel receiver 142 also generates a timing and phase signal. In one embodiment, a single signal is generated indicative of both timing and phase. In another embodiment of this invention where phase is not needed, only timing information needs to be obtained.

A phase discriminator 144 compares the phase signal output by the pilot signal receiver 140 to the phase signal output by the overlay channel receiver 142 and generates an error signal indicative of the phase difference between these signals. The construction of the phase discriminator 144 can be according to any number of well-known devices for implementing techniques for determining phase error or phase differences. In alternative embodiments, the sync unit could monitor some other channel transmitted by the existing base station such as the paging channel or sync channel. In yet another alternative embodiment, the overlay BTS 118 transmits the pilot signal which is monitored by the sync unit 128 and the sync unit 128 monitors another channel transmitted by the existing BTS 114.

The phase error signal output by the sync unit 128 is coupled to a phase error input of the overlay BTS 118. The overlay BTS 118 uses the phase error signal to modify the phase of the transmitted signal from the overlay BTS 118 in order to decrease the size of the phase error. This process can be accomplished by many well-known methods depending on the individual design of the overlay BTS 118. For example, the phase error can be used to control a voltage controlled oscillator (VCO) which is used to generate one or more of the local oscillator frequencies for the overlay BTS 118. Alternatively, a phase shifter or delay line can be developed within the analog or digital circuitry which is controlled by the error signal from the sync unit 128. In an alternative embodiment, the output of the sync unit 128 can be coupled to the existing base station 114 and used to adjust the phase thereof. In general, the process aligns the phase of the signals transmitted by the overlay BTS with the signals transmitted by the existing BTS. Because the signals from the existing BTS are aligned with each other, and the signals from the overlay BTS are aligned with each other, this alignment has the effect of phase aligning all of the signals with each other.

In much the same manner, the sync unit 128 can be used to align the timing of the overlay BTS 118 with the timing of the existing BTS 114. A time error detection unit 146 within the sync unit 128 generates an error signal reflecting the relative timing of the signal output by the existing base station 114 and the overlay base station 118. In general, the existing base station 114, as well as the overlay base station 128 comprise a timing generator which is configured to be adjusted in order to synchronize the system time to a universal reference. The timing error signal generated by the sync unit 128 can be coupled to the timing generator to adjust the timing between the existing base station 114 and the overlay base station 118 so that the timing error decreases. Because the signals from the existing BTS are aligned with each other, and the signals from the overlay BTS are aligned with each other, this alignment has the effect of time aligning all of the signals with each other.

Another important aspect associated with overlaying a second CDMA system over an existing CDMA system is the need to control the loading on each system. The loading is important for determining the admission policies. Admission policies refer to the decisions that the wireless system needs to make on whether to permit additional voice or data calls to be added, permit higher data rates to be used. These admission policies in turn increase or decrease loading. As noted above, in general, the number of active traffic channels is indicative of the loading of the system but it is not dispositive. Thus, simply counting the number of active traffic channels and passing this information from the existing BTS 114 to the existing BSC 112 and to the MSC 110 and from there to the overlay BSC 116 and finally to the overlay BTS 118 does not provide an accurate estimation of the loading on the system. In addition, such a scheme involves the modification of the exiting system. However, in order to avoid arbitrary admission limits on each system, it would be advantageous to develop a composite measure of loading. The composite measure of loading can be used to influence the admission policies of the overlay BTS 116 and the existing BTS 114 so that the total load on each of the BTS's remains within a reasonable limit.

In one embodiment, the sync unit 128 is also used to provide loading information to the overlay system without requiring modification to the existing system. For example, a power measurement unit 148 is coupled to the antenna 126 and measures the power on each forward link code channel generated by both the existing and overlay systems. In addition, the pilot signal receiver 140 determines the power of the pilot channel. Based upon this information, a compare unit 150 can determine a loading indication α according to Equation 2 below.

$$\alpha = \frac{\left(\frac{E_p}{I_C}\right)_{maximum}}{\left(\frac{E_p}{I_C}\right)_{current}} \qquad \text{Eq. 2}$$

wherein:

α is a loading indication which remains less than one to indicate stable system behavior;

$E_p$ is the energy of the pilot signal;

$I_c$ is the total energy of the forward link code channels including the pilot channel;

$$\left(\frac{E_p}{I_C}\right)_{maximum}$$

is the predetermined pilot channel fraction which ensures stable behavior of the system; and $$\left(\frac{E_p}{I_C}\right)_{current}$$

is equal to the current pilot channel fraction.

In one embodiment the compare unit 150 calculates a load indication according to Equation 2 and provides this information to the overlay BTS 118 which uses this value in an admission algorithm. In one embodiment, the existing BTS 114 continues to use a predetermined admission algorithm in the same manner as prior to introduction of the overlay BTS 118.

Referring again to FIG. 4, note that the power measurement unit 148 measures the power on each forward link code channel for each channel of the existing system as well as each channel of the new overlay system. Therefore, with reference to FIG. 2, in one embodiment, the power measurement unit 148 measures the power on each forward link code channel for each of the channels shown.

The pilot signal receiver 140, the overlay channel receiver 142 and the power measurement unit 148 each perform the demodulation of signals. Therefore, in one embodiment, these blocks may be efficiently implemented in a single time-shared unit. In another embodiment, at least a portion of the receiver hardware is shared among these units.

In the embodiments just described, a single pilot signal is transmitted by either the existing system or the overlay system. The common pilot signal is used by remote units operating in both systems in order to determine a phase reference which is used to demodulate the traffic channel signals. In an alternative embodiment, the principles of auxiliary pilot channel operation can be applied to either the existing system or the overlay system. The auxiliary pilot provides a phase reference which is used by the remote unit in demodulating signals from the overlaid base station.

Figure 5:
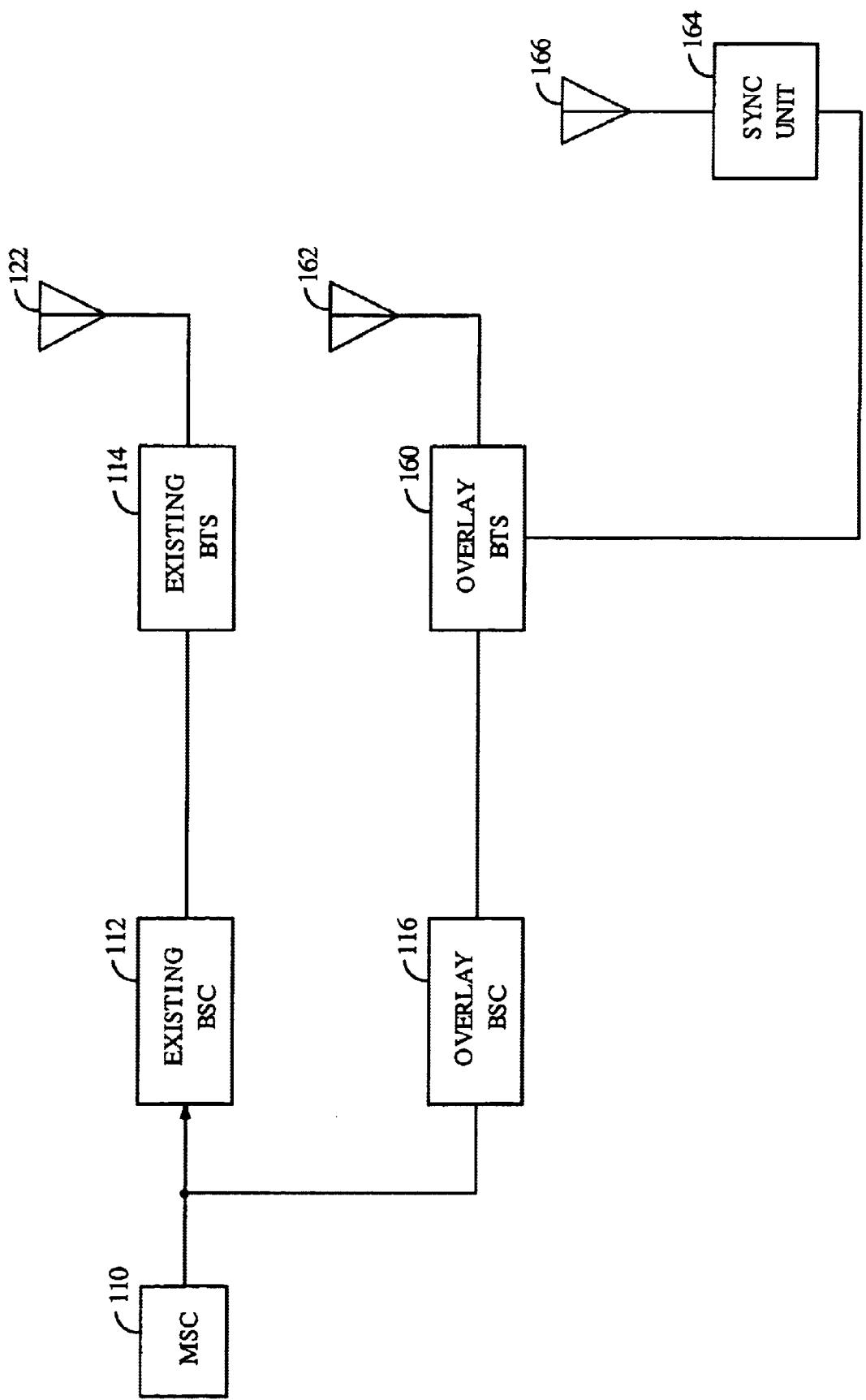
FIG. 5 is a block diagram of a cellular system in which the overlay system utilizes an auxiliary pilot channel.
Figure 6:
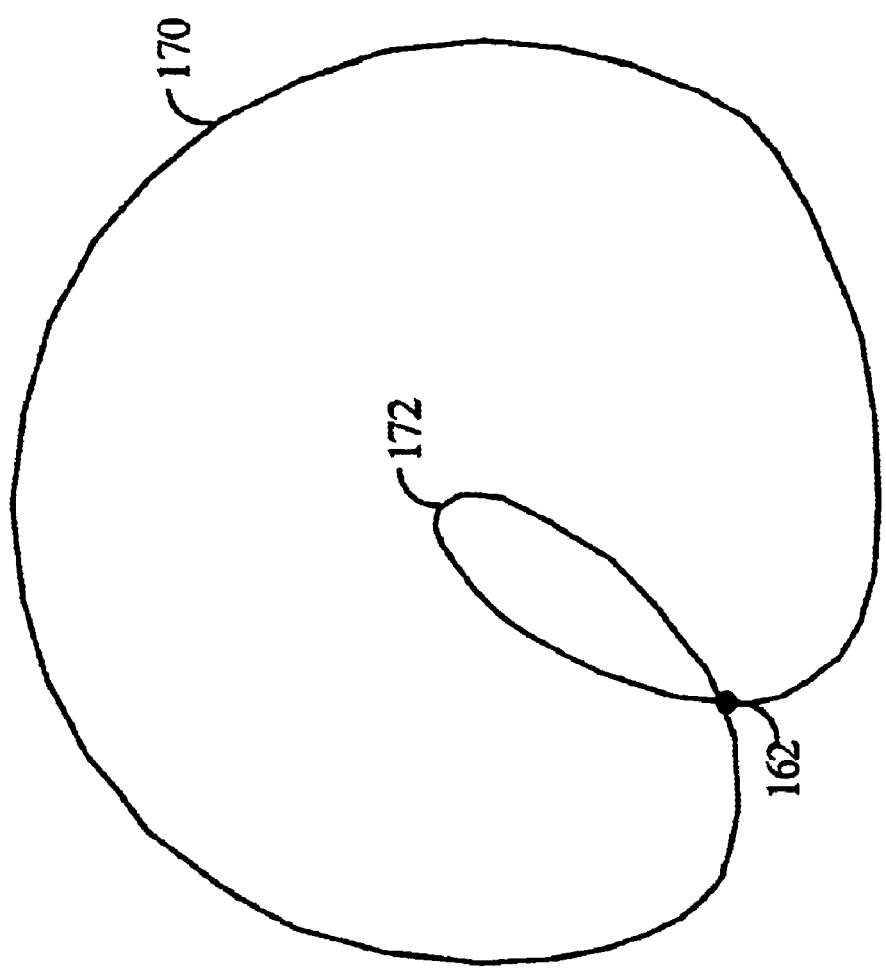
FIG. 6 is a representative drawing showing the use of a directional, spot antenna.

FIG. 5 is a block diagram of a system in which the overlay system utilizes an auxiliary pilot channel. In FIG. 5, the overlay BSC 116 is coupled to an overlay BTS 160. The overlay BTS 160 is coupled to a directional, spot antenna 162. The directional, spot antenna 162 provides an area of coverage within the coverage area of the existing system. For example, FIG. 6 is a representative drawing showing the use of a directional, spot antenna. The larger region 170 represents the coverage area of the antenna 122 and the smaller coverage area 172 represents the coverage area of the directional, spot antenna 162. In an actual system, a directional, spot antenna may be used to provide a coverage area primarily including a particularly high-loading region. For example, a directional, spot antenna may be used to provide coverage area to a football stadium, shopping mall or university campus. In one embodiment, the spot antenna 162 can have the same coverage as the antenna 122. Furthermore, it is not necessary to have a separate antenna to use the auxiliary pilot channel. In this case, the auxiliary pilot channel can be used to provide the phase reference for the signals transmitted by the overlaid base station in the manner illustrated by FIG. 3. In this embodiment, sync unit 164 provides for timing of existing base station 114 relative to overlaid base station 118 or 162.

In this embodiment, the overlay BTS 160 transmits an independent pilot which is orthogonal to the pilot signal transmitted by the existing BTS 114. In the embodiment in which the overlaid BTS has a smaller coverage area than the existing BTS, as a remote unit drives from within the coverage area 170 into the coverage area 172, the remote unit performs a handoff from the existing system to the overlay system, according to well-known techniques. Within the coverage area 172, the remote unit uses the pilot signal transmitted by the overlay BTS 160 as a phase reference. For this reason, it is no longer necessary for the signals transmitted from the overlay base station 160 to be in phase synchronization with the signals transmitted from the existing BTS 114 as perceived by the remote unit.

Although in the case of a cdma2000 system overlaying an IS-95 system when the auxiliary pilot is used by the overlay system, phase synchronization is not required between an existing system and an overlay system, time synchronization is still important to provide orthogonality of the signals. Therefore, in FIG. 5, the sync unit 164 and antenna 166 need only provide time synchronization information to the overlay base station 160.

In some embodiments, the pilot signal used by the overlay system 160 uses a longer Walsh sequence than the existing BTS. For example, in one embodiment, the pilot signal transmitted by the existing BTS 114 is 64 chips in length while the Walsh symbol used to transmit the pilot from overlay BTS 160 is 512 chips in length. The use of a more lengthy Walsh sequence allows for the generation of many more orthogonal pilot signals, thus, allowing auxiliary pilot channels to be assigned more often within a system. Additional information concerning auxiliary pilot channels can be found in U.S. Pat. No. 6,285,655 entitled "Method and Apparatus for Providing Orthogonal Spot Beams, Sectors and Picocells" filed Sep. 8, 1997 and issued to Lundby et al. on Sep. 4, 2001, Ser. No. 08/925,521 (the '521 application) which is assigned to the assignee hereof and incorporated herein in its entirety by reference. The '521 application describes a method and apparatus for providing additional pilot channels that has minimum impact on the number of available Walsh channels. The '521 application describes a method of concatenating combinations of a Walsh sequence and the complement of the Walsh sequence to provide an auxiliary pilot reference sequence.

Figure 7:
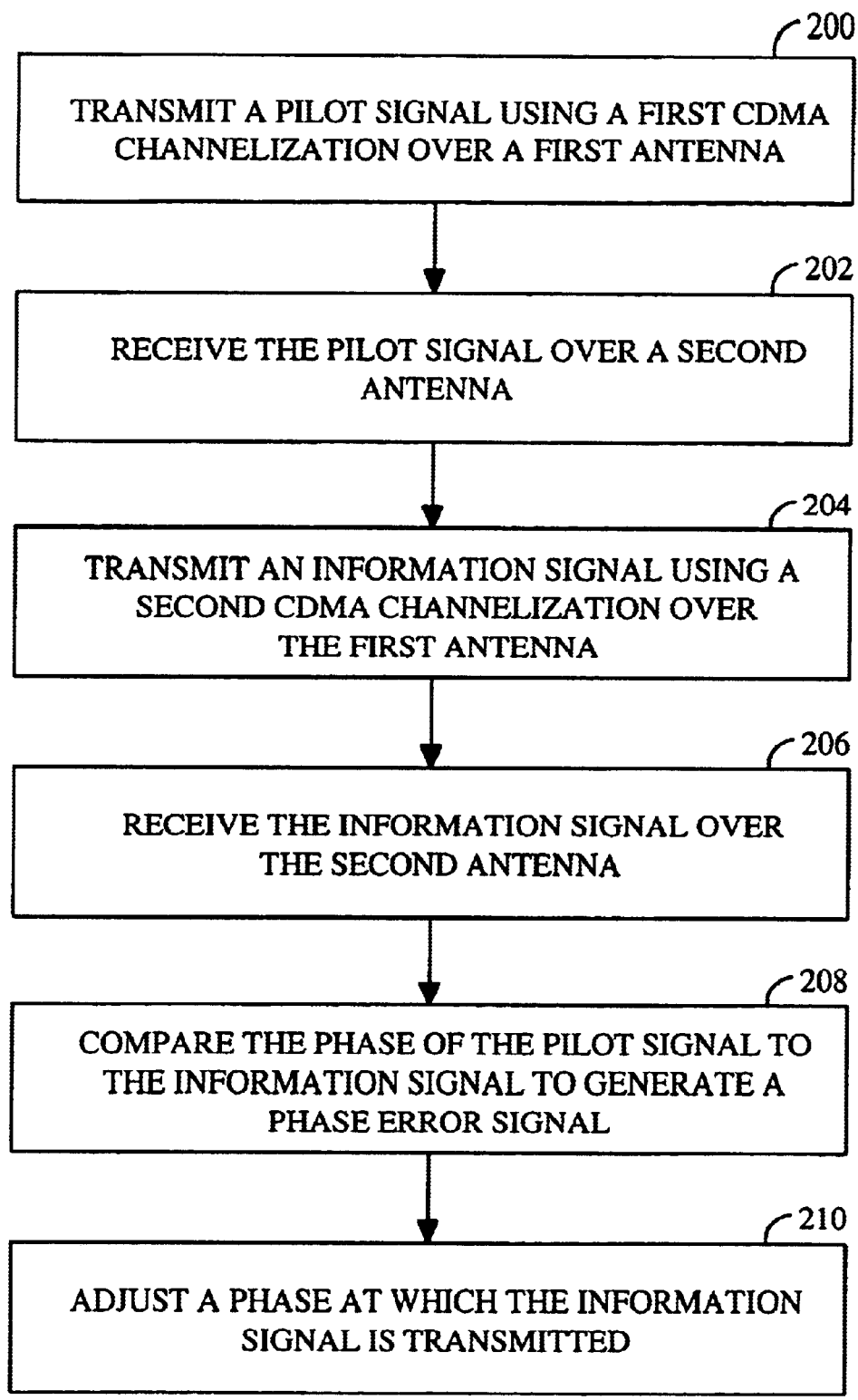
FIG. 7 is a flowchart illustrating phase synchronization according to the invention.

FIG. 7 is a flowchart illustrating phase synchronization according to the invention. The teaching of FIG. 7 can be applied directly to time synchronization. In block 200, the existing BTS 114 transmits a pilot signal using the first CDMA channelization over the antenna 122. In block 202, the sync unit 128 receives the pilot signal over the antenna 126. In block 204, the overlay BTS 118 transmits an information signal using the second CDMA channelization and transmits it over the antenna 122. The information signal can be a traffic channel or other remote unit specific signal or it can be a broadcast signal such as a sync channel or paging channel transmission. In block 206, the sync unit 128 receives the information signal over the antenna 126. In block 208, the sync channel 128 compares the phase of the pilot signal to the phase of the information signal and generates a phase error indication. In block 210, the overlay BTS 118 adjusts the phase at which the information signal is transmitted in response to the phase error signal.

In the case of timing synchronization, block 208 can be replaced with a block which compares the timing of the pilot signal to the timing of the information signal to generate a timing error signal. Likewise, block 210 can be replaced with a block which adjusts the timing at which the information signal is transmitted.

Figure 8:
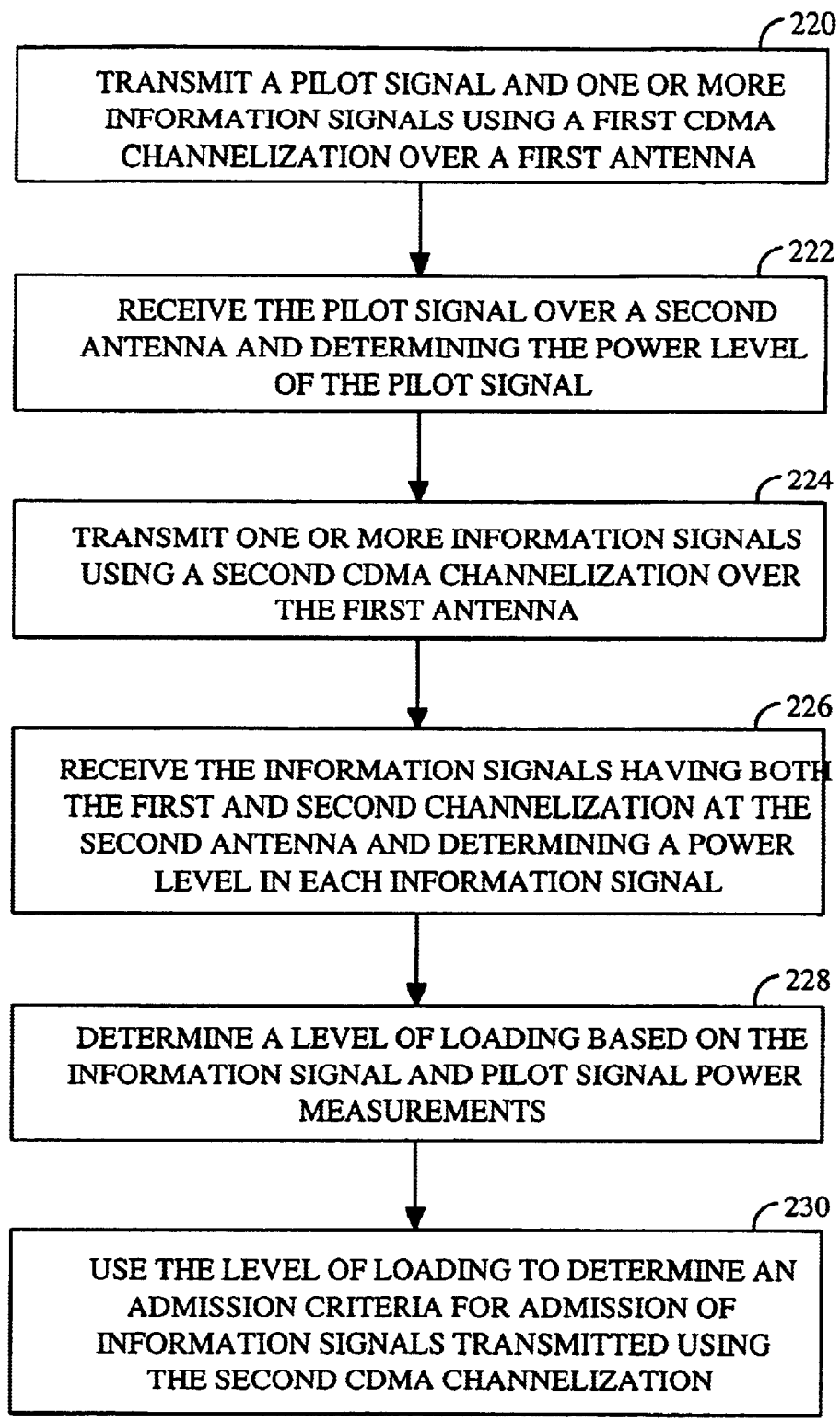
FIG. 8 is a flowchart showing load control according to the invention.

FIG. 8 is a flowchart showing one embodiment of a load control mechanism according to the invention. In block 220, the existing base station 114 transmits a pilot signal and one or more information signals over the antenna 122 using the first CDMA channelization. In block 222, the sync unit 128 receives the pilot signal over the antenna 126 and determines a power level of the pilot signal. In block 224, the overlay base station 118 transmits one or more information signals using the second CDMA channelization over antenna 122. In block 226, the sync unit 128 receives the information signals transmitted using the first and second CDMA channelization over the antenna 126 and determines a power level of each of the information signals. In block 228, the sync unit 128 determines a level of loading based upon the power measurements. In an alternative embodiment, the determination of loading may be calculated within the overlay BTS 118 or at some other location. In block 230, the level of loading is used to determine an admission criteria for the admission of additional signals transmitted from overlay BTS 118 using the second CDMA channelization.

With respect to FIGS. 7 and 8 and the alternate embodiments discussed above, the process of obtaining signal energy via a second antenna may be executed using a directional coupler or other signal energy coupling mechanism as noted above.

The invention may be embodied in other specific forms without departing from its spirit or essential characteristics.

For example, in one embodiment, the overlay system is a system having a more narrow channel bandwidth while the existing system has a more broad band channel. In one embodiment, more than two systems are overlaid upon one another. The described embodiment is to be considered in all respects only as illustrative and not as restrictive and the scope of the claim of the invention is, therefore, indicated by the appended claims rather than by the foregoing descriptions. All changes which come within the meaning and range of equivalency of the claims are to be embraced within their scope.

What is claimed is:

1. A method of overlaying a second CDMA system over a first CDMA system comprising the steps of:

receiving a first signal and one or more first information signals, said first information signals using a first CDMA channelization and providing service to a first coverage area;

receiving one or more second information signals, said second information signals using a second CDMA channelization and providing service to at least a portion of said first coverage area;

determining a power level of said first signal;

determining a power level of each of said one or more first information signals;

determining a power level of each of said one or more second information signals; and determining a level of loading within said at least said portion of said first coverage area based upon said power level of said first signal and said power levels of said one or more first and second information signals.

2. The method of claim 1, further comprising the step of transmitting said one or more first information signal and said one or more second information over a first antenna.

3. The method of claim 1, wherein steps of receiving comprise the step of receiving signal energy over a second antenna.

4. The method of claim 1 wherein steps of receiving comprise the step of using a coupler.

5. The method of claim 1 further comprising using said level of loading to determine an admission criteria for admission of information signals transmitted using said second CDMA channelization.

6. The method of claim 1 wherein said second CDMA channelization has a wider spectrum than said first CDMA channelization.

7. The method of claim 1, wherein said first CDMA channelization has a wider spectrum than said second CDMA channelization.

8. The method of claim 1 wherein said first signal is a pilot signal.

9. A CDMA system comprising:

a first base station configured to transmit a first signal and one or more first information signals, said first information signals providing service to a first coverage area;

a second base station configured to transmit one or more second information signals having a second CDMA channelization, said second information signals providing service to at least a portion of said first coverage area; and a sync unit configured to obtain a power level corresponding to each of said first signal and said one or more first and second information signals;

wherein said second sync unit is further configured determine a level of loading within said at least said portion of said first coverage area based upon said power measurement of said first signal and said power measurements of said one or more first and second information signals.

10. The CDMA system of claim 9, wherein said second base station is further configured to determine an admission criteria for admission of information signals transmitted using said second CDMA channelization.

11. A sync unit comprising:

a first receiver configured to receive a first signal having a first CDMA channelization and to produce an indication of a timing of said first signal;

a second receiver configured to receive a second signal having a second CDMA channelization and to produce an indication of a timing of said second signal; and a time error detection unit configured to compare said timing of said first signal and said timing of said second signal to determine a relative timing offset indication to be used to adjust a transmission timing of said second signal.

12. The sync unit of claim 11 wherein said sync unit further comprises an antenna through which said first and second signal are received.

13. The sync unit of claim 11 wherein said sync unit further comprises a coupler through which said first and second signal are received.

14. The sync unit of claim 11, wherein said first and second receivers share at least a portion of hardware.

15. The sync unit of claim 11 wherein said first and second receivers are a single time-shared unit.

16. The sync unit of claim 11, further comprising a phase error detection unit configured to compare a phase of said first signal and a phase of said second signal to determine a relative phase offset indication to be used to adjust a transmission phase of said second signal.

17. The sync unit of claim 11 further comprising a power measurement unit configured to determine a power level of said first and second signal and a compare unit configured to determine a level of loading within a coverage area corresponding to said first and second signals.

18. A sync unit comprising:

a first receiver configured to receive a first signal and one or more first information signals having a first CDMA channelization, said first information signals providing service to a first coverage area;

a second receiver configured to receive one or more second information signals having a second CDMA channelization, said second information signals providing service to at least a portion of said first coverage area;

a power measurement unit configured to determine a power level of said first signal, a power level of each of said one or more first information signals, and a power level of each of said one or more second information signals; and a compare unit configured to determine a level of loading within said at least said portion of said first coverage area based upon said power level of said first signal and said power level of said one or more first and second information signals.

* * * * *